United States Patent
Batzer et al.

(10) Patent No.: US 6,188,720 B1
(45) Date of Patent: Feb. 13, 2001

(54) MODULATION AND SIGNALING CONVERTER

(75) Inventors: John Batzer, New Providence, NJ (US); John Bertrand, Upper Nyack, NY (US); Charles Haight, Pine Brook, NJ (US)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 08/437,409

(22) Filed: May 12, 1995

(51) Int. Cl.$^7$ ................................. H04B 1/38; H04L 5/16
(52) U.S. Cl. .................... 375/222; 370/401; 370/467; 370/471
(58) Field of Search ................. 375/222, 8; 379/96; 370/401, 465, 466, 467, 471, 402, 404; 710/52, 58

(56) References Cited

U.S. PATENT DOCUMENTS

| | | | |
|---|---|---|---|
| 4,825,448 | * | 4/1989 | Critchlow et al. ............. 375/222 |
| 4,852,122 | * | 7/1989 | Nelson et al. ................ 375/222 |
| 4,884,269 | * | 11/1989 | Duncanson et al. ............ 375/222 |
| 5,321,722 | * | 6/1994 | Ogawa ........................ 375/8 |
| 5,327,486 | * | 7/1994 | Wolff et al. ................. 379/96 |
| 5,331,634 | * | 7/1994 | Fischer ...................... 370/85.13 |
| 5,392,283 | * | 2/1995 | Bocci et al. ................. 360/79 |
| 5,479,480 | * | 12/1995 | Scott ........................ 375/222 |
| 5,504,802 | * | 4/1996 | Kennedy et al. .............. 375/222 |
| 5,598,581 | * | 1/1997 | Daines et al. ............... 370/401 |
| 5,633,891 | * | 5/1997 | Rebec et al. ................ 370/79 |
| 5,724,356 | * | 3/1998 | Parameswaran Nair et al. ... 370/466 |
| 5,729,549 | * | 3/1998 | Kostreski et al. ............ 370/522 |
| 5,742,760 | * | 4/1998 | Picazo, Jr. et al. .......... 370/401 |
| 5,884,040 | * | 3/1999 | Chung ....................... 370/401 |

OTHER PUBLICATIONS

B. K. Penney and A. A. Baghdadi, Survey of computer communications loop networks : Part 1(see p. 167; 3rd paragraph; lines 1–4), Aug. 4, 1979.*

* cited by examiner

*Primary Examiner*—Don N. Vo
(74) *Attorney, Agent, or Firm*—Saul Elbaum

(57) ABSTRACT

The communication system has a first modem having a digital port for communicating a first data block in a first format between a first transmission channel and the digital port and a second modem having a digital port for communicating a second data block in a second format between a second transmission channel and the digital port. The first data block has a header block and a message block. The controller/processing device comprises a first interface means, a second interface means and a conversion means. The first interface means is adapted for receiving the first data block in the first format from the first digital port. The conversion means is coupled to the first interface means. The conversion means converts the first data block in the first format to the second data block in the second format. The second interface means is coupled to the conversion means. The second interface means is adapted for sending the second data block in the second format to the second digital port. The second interface means starts sending the second data block after said the interface means has received the header block and before it has received the message block.

12 Claims, 7 Drawing Sheets

MODULATION AND SIGNALING CONVERTER

FIELD OF THE INVENTION

This invention relates generally to voice and data communications systems, and in particular, to a modem conversion system which allows secure communications between differing transmission channel types, with minimal call set-up delays.

BACKGROUND OF THE INVENTION

In contemporary voice and data communications systems, modulation schemes are generally selected to be most consistent with the characteristics of the particular transmission channel. As a result, a modulation type used for a wireless high frequency (HF) channel, for example, may not be the one best suited for a wire-line channel. In addition, the signaling, such as the information exchange that takes place during call set-up, is often matched to the characteristics of the channel type or application. For example, the start of signaling for HF transmissions usually contains Doppler tones that allow the determination of Doppler shift. These Doppler tones are used to correct for Doppler shifts in the transmitting frequency due to the velocity of the moving vehicle containing the communications equipment. On the other hand, the start of signaling for wire-line transmission typically contains tones that allow for the estimation and subsequent cancellation of echoes.

Many modern communications systems attempt to provide global connectivity, in which case the transmission channel may span several media. For instance, one part of the transmission may take place over a wireless HF channel and another part over a wire-line one. Since the modulation and signalling protocols on the wireless and wire-line sides differ, a modem converter is necessary to convert modulation and signaling to the one that is appropriate for each portion of the transmission channel.

In one type of wireless to wire-line communications link, one end of the link may be in a mobile vehicle several hundred miles from an HF base station that is connected to a public telephone line. The other end of the link is a public telephone subscriber at another location. Upon the start of a call from the mobile vehicle, modulated signaling and message data is transmitted to the HF base station. Two separate modems are located at the base station, a HF modem for interfacing with the HF part of the link, and a wire-line modem connected to the public telephone line. The HF modem demodulates the data received from the mobile vehicle and modulates data to be transmitted to the mobile vehicle in the reverse direction. The modem conversion occurs as the HF modem transfers the demodulated data to the wire-line modem and vice-versa in the reverse direction. Thus each modem acts as a bit source for the other. The wire line modem then modulates the data in the wire-line format. This modulated data is then conveyed via the public telephone company to the intended subscriber at the other end of the link. In the opposite communications direction, the sequence is reversed.

In the prior art system just described, the HF modem at the base station generally receives an entire block of signalling and message data in the HF format, prior to the wire-line modem transmitting any corresponding signalling or message data in the wire-line protocol towards the wire-line subscriber. Each modem is therefore unaware of the signaling that is occurring at the other modem, and only views the other as a source or sink of data. The modems do not notify each other of ongoing signaling stages, but instead wait until appropriate data blocks are collected which are then passed on. This approach can introduce significant delays in the call set-up portion of the communication. These delays are not only annoying, particularly for voice communication, but can also cause the data sources at the ends of the link to time out.

It is therefore an object of the present invention to provide a modulation and signalling conversion system to allow voice or data communication between differing transmission channel types, which system introduces only minimal delays in the signalling and message data transfers.

SUMMARY OF THE INVENTION

These and other objects of the invention are achieved by providing a modulating and signalling conversion system. The communication system has a first modem for communicating a first data block in a first format between a first transmission channel and a first digital port and a second modem for communicating a second data block in a second format between a second transmission channel and a second digital port. The first data block has a header block and a message block.

A controller/processing device comprises a first interface means, a second interface means and a conversion means. The first interface means is adapted for receiving the first data block in the first format from the first digital port. The conversion means is coupled to the first interface means. The conversion means converts the first data block in the first format to the second data block in the second format. The second interface means is coupled to the conversion means. The second interface means is adapted for sending the second data block in the second format to the second digital port. The second interface means starts sending the second data block after said the interface means has received the header block and before it has received the message block.

BRIEF DESCRIPTION OF THE DRAWINGS

For a full understanding of the present invention, the above objects and further features and advantages of the invention are described in detail in an exemplary embodiment below in conjunction with the drawings, of which.

DETAILED DESCRIPTION OF THE PREFERRED EMBODIMENTS

At the outset, it is noted that the present invention will be described in reference to a wireless HF to a wire-line communication link; however, it is understood that the invention is also applicable to other communication links that have differing transmission channel types in separate portions of the link.

Figure 1:
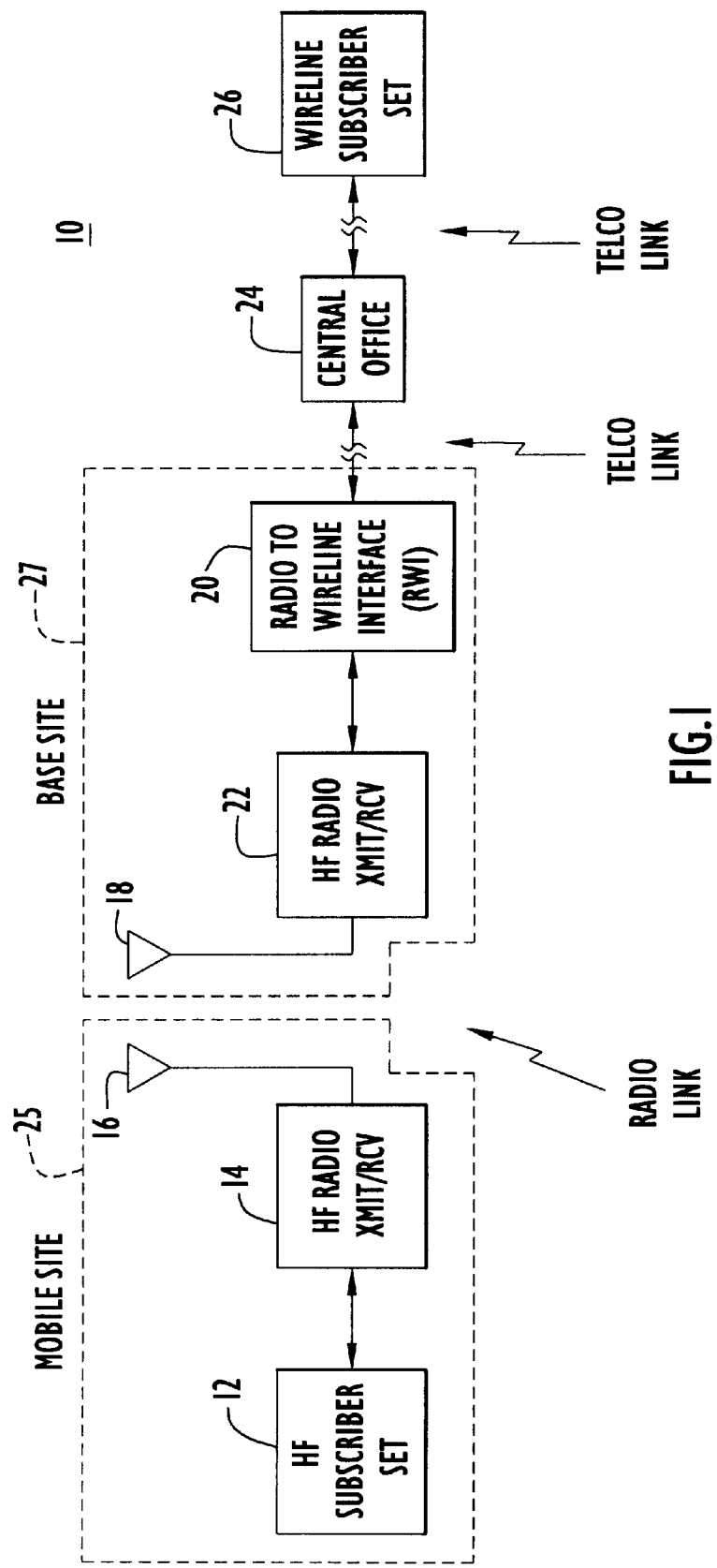
FIG. 1 shows a wireless to wire-line communications link according to the present invention.

With reference now to FIG. 1, there is shown a block diagram of a wireless to wire-line communications link 10 according to the present invention. The communications link 10 includes a novel radio to wire-line interface (RWI) 20 which will be shown to substantially reduce communication delays due to the differing signaling and message protocol requirements on both sides of the link. The shown communication link 10 is a link between a high frequency (HF) subscriber set 12 at a mobile site 25, and a wire-line subscriber set 26 connected to a telephone line of a public service telephone network (PSTN) central office 24. The HF subscriber set 12 may be a conventional digital telephone set suitable for mobile radio communications, such as a military standard KY-99. Advantageously, the subscriber set 12 may be controlled by a personal computer (not shown) to enable computer data files to be transmitted and received over the communication link. In addition, the HF subscriber set 12 of course includes an HF modem to modulate and demodulate either digitized voice information or computer data. Whether digitized voice or computer data is to be communicated, an HF radio transmit/receive unit 14 at the mobile site provides an HF input/output interface between the subscriber set 12 and an antenna 16.

The modulated data to and from the mobile site 25 is communicated via a radio link of up to several hundred miles to a strategically located base site 27. An antenna 18 coupled to another HF radio transmit/receive block 22, together function as the radio interface. The RWI 20 located at the base site, converts the signaling, message and traffic data received by the transmit/receive block 22 in the HF format, to a wire-line format and vice versa. From the RWI 20, the wire-line signaling and other communication data is transmitted to and from the PSTN central office 24 via a wire-line telephone company link. In this manner, the digitized information originating at the mobile site can finally be communicated to the intended wire-line subscriber set 26 via another telephone company link. The wire-line subscriber set 26 may be, for example, a two wire secure telephone unit such as the STU-III, a military standard telephone set. In any case, the subscriber set 26 includes a wire-line modem and preferably, a computer (both not shown) to transmit and receive computer data files in addition to digitized voice information.

Figure 2:
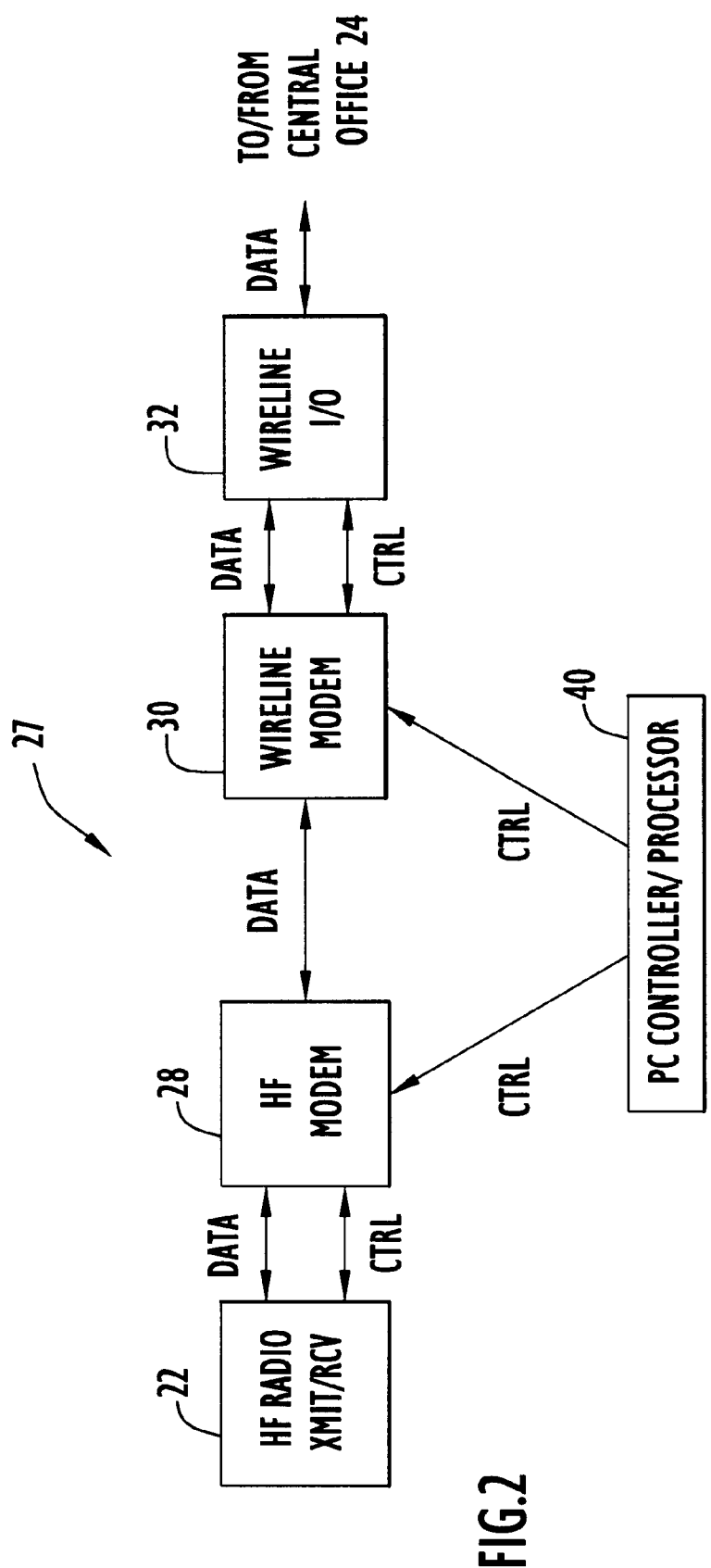
FIG. 2 depicts a block diagram of the radio to wire-line interface shown in FIG. 1.

Referring now to FIG. 2, a preferred configuration for the radio to wire-line interface (RWI) 20 is shown in block diagram format. A PC controller/processor 40 is employed to provide control signals to an HF modem 28 and to a wire-line modem 30. Control and data signals are also communicated to and from the HF modem 28 and the HF radio transmit/receive block 22, and to/from the wire-line modem 30 and wire-line input/output interface 32. The data that flows to/from the block 22 through the RWI 20 to the central office 24, and eventually to the subscriber sets 12 and 26 of FIG. 1, contains the signaling and communication data. It is noted that the shown RWI 20 is absent a communications security (COMSEC) means, and thus acts as a black gateway, thereby avoiding problems associated with red gateways. With a black gateway, the information bits of the transmissions do not have to be examined, so that additional delays are not introduced.

The HF modem 28 is advantageously a multi-mode Advanced Narrow Band Digital Voice Terminal (ANDVT), parallel-tone modem. One of the modes support voice data communications while several other modes support compute data file transfer at differing data rates. In the voice mode, a thirty-nine tone system is implemented, whereas a sixteen tone system is employed in the data file modes.

The wire-line modem 30 and input/output interface 32 may support a quaternary phase shift keying (QPSK) modulation scheme on the wire-line side, as is conventionally used by a STU III Modem. QPSK modulation schemes are well known, as are STU-III telephone sets, and therefore the details of QPSK modulation need not be elaborated upon.

The signaling information required on the wire-line side of the link, such as the path in FIG. 1 from the RWI 20 to the wire-line subscriber set 26, may include puseado 1800 Hz (P1800) tones which are necessary for echo cancellation. As is well known, echo cancelers may be used at both ends of a wire-line communication link to eliminate only reflected signals and not the electrical signals representing the party's speech. An echo canceler operates by storing transmitted speech for a period of time equal to the round-trip delay of the circuit. Then, the stored signal is properly attenuated and subtracted from the incoming return signal. Thus echo cancellation requires knowledge of circuit length, the echo return loss and continuous storage of the transmitted signal. By transmitting the P1800 tones on one side of the wire-line link and then gathering the energy reflected from the other side, the requisite parameters become known and echo-cancellation becomes possible.

The signaling on the wireless side, from the RWI 20 to the HF subscriber set 12, does not include P1800 echo cancellation tones but rather includes Doppler tones to compensate for transmitted frequency errors due to the velocity of the mobile vehicle at the mobile site 25. The Doppler tones are also used to correct for differences in the actual transmitting frequency and the tuned receiver frequency due to tolerance variations and the like.

Figure 3:
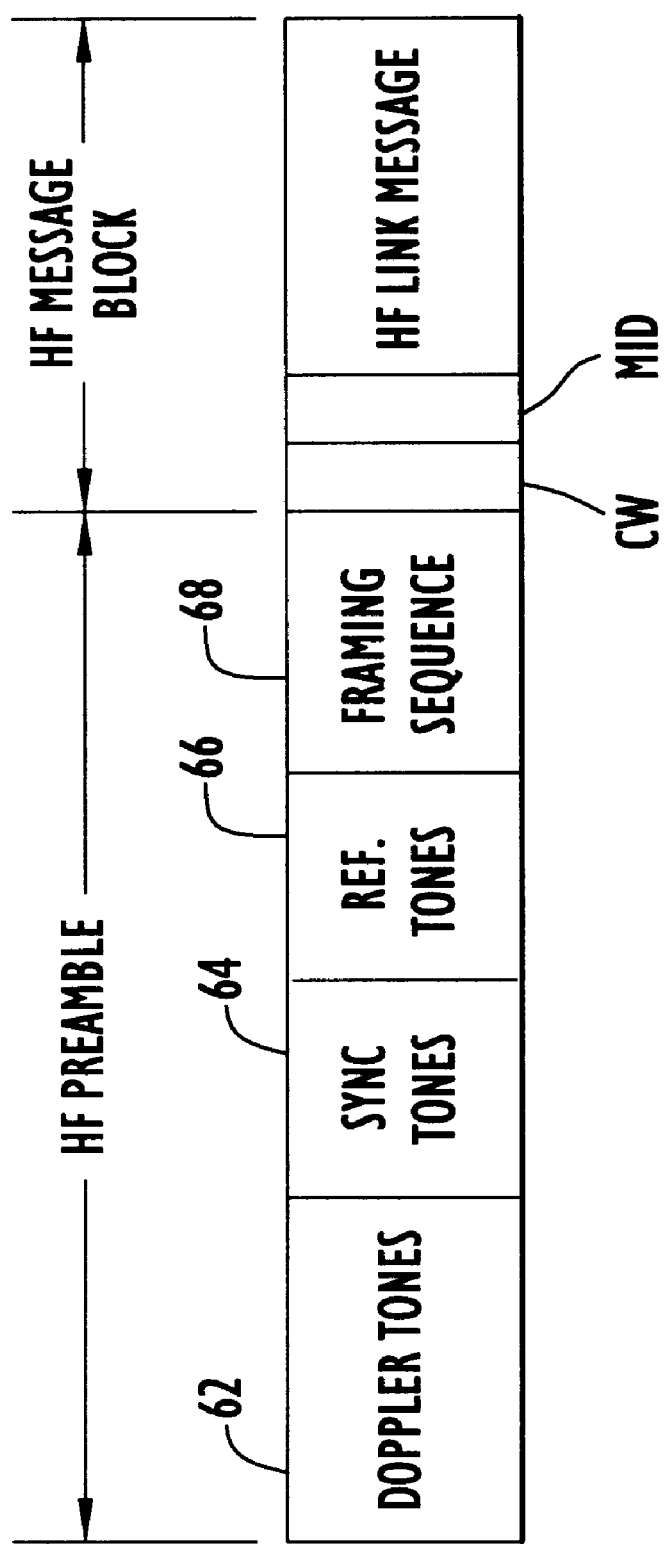
FIG. 3 illustrates an HF signalling and messaging protocol.

Shown in FIG. 3 is the signalling and message protocol for data communication on the HF side of the link, i.e. between the RWI 20 and the HF subscriber set 12. Each data transmission during the call set up portion of the communication will begin with an HF preamble on the order of 700 ms, followed by a Message Block. The HF Preamble data sequence consists of a data stream of Doppler tones 62 followed by a stream of synchronization tones 64, reference tones 66 and a framing sequence 68. This HF Preamble is one that would be conventionally used for tactical wireless communications between a mobile site and a strategic base site, and therefore the details of the data signals there within will not be elaborated upon. Following the HF Preamble, the first portion of the message block is a control word (CW) sequence which may be a four bit codeword. The Control Word will identify the type of data to be transmitted, thus one codeword may indicate a point to point voice communication; another may correspond to a data transmission at 300 bits/sec., while yet another codeword may indicate data transmission at 2400 bits/sec., and so on. Following the CW sequence, an eight bit message identifier (MID) word is transmitted, which will identify the type of HF link message to be transmitted. A distinct 8 bit MID codeword can be used to identify one of the following HF link messages: Dialing; Dialing Status; Call status; Capabilities/Status Vector (CAP/SV); Capabilities/Status Vector/Terminal Cipher (CAP/SV/TC); Terminal Cipher/Random Component Cipher (TC/RCC); Random Component Cipher (RCC); Crypto Synchronization (CS); and traffic data. Following the MID codeword, the corresponding HF link message is transmitted which may be 116 information bits followed by a 124 parity bit block. The HF link messages of Dialing, Dialing Status and Call Status may be single Bose-Chaudhuri-Hocquenghem (BCH) binary block codes. The traffic data HF link messages consist of encrypted voice traffic data where the encryption codes are deciphered by the microprocessors within the receiving subscriber set 12 or 26 at both ends of the communications link. The other HF Link messages are used for secure call set up between the HF subscriber set 12 embodied as a KY-99 and the wire-line subscriber set 26 embodied as a STU-III.

Figure 4:
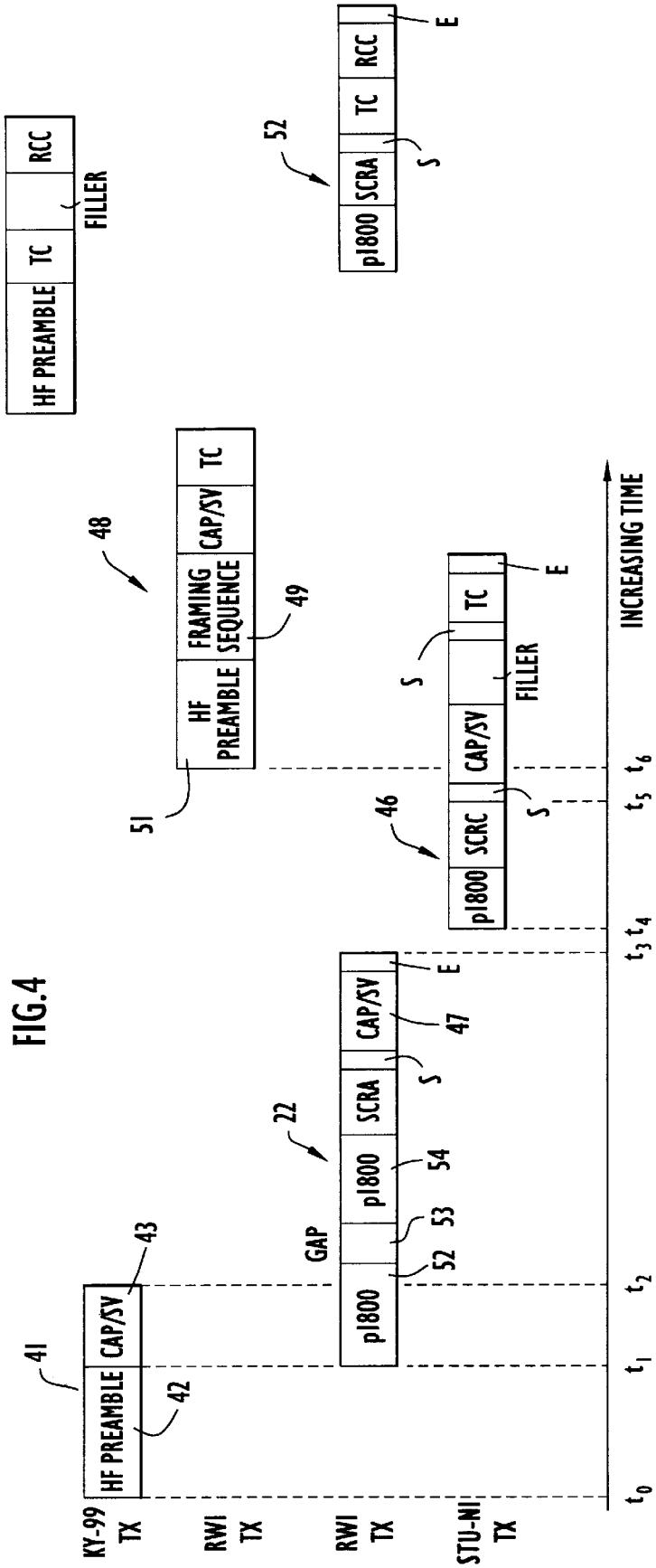
FIG. 4 shows various signalling and messaging sequences communicated within the communications link of FIG. 1.

Referring now to FIG. 4, the various signalling and messaging sequences to be transmitted within the communications link 10 of FIG. 1. are shown. The shown timing diagrams illustrate call set up data communication for the case of a call originating at the mobile site 25. In the illustrative example, a KY-99 telephone set is used for the HF subscriber set 12 while a STU-III is employed for the wire-line subscriber set 26. At the time $t_o$, the KY-99 transmits a data block 41 towards the base site 27 using phase shift keying (PSK) modulation which is the standard modulation of KY-99 phone sets. It is noted that the HF modulation scheme employed is not critical to the invention; as such, other modulation schemes suitable for an HF radio link can conceivably be utilized. The data block 41 consists of an HF preamble 42 data sequence followed by an HF Message Block 43 in the time interval $t_1$–$t_2$, for which the HF link message is a Capabilities/Status Vector (CAP/SV). The CAP/SV message functions to announce the capabilities of the HF subscriber set 12. In addition, the CAP/SV block identifies that the call originating from the KY-99 has a predetermined final destination i.e., the wire-line subscriber set 26. Therefore, there is no need for a Dialing sequence to be entered when the CAP/SV option is taken by a KY-99 user. A push-button on the KY-99 set or a programming instruction within a controlling computer (if used) at the mobile site 25, will access the CAP/SV option. For convenience, the CW and MID codeword within the HF message block 43 are not shown, these codewords are understood to immediately follow all HF preambles shown in FIG. 4. It is noted that time interval between $t_1$ and $t_2$ is approximately 250 ms in this example.

Once the RWI 20 has received the HF preamble 42 of the data block 43, it begins transmitting a signalling/message block 44 towards the wire-line subscriber set 26 via the central office 24. The first portion of signalling/message block 44 is a pusedo 1800 (P1800) signalling preamble 52. The P1800 preamble begins at time $t_1$ which is also the approximate time that the RWI 20 begins receiving the HF Message Block (CAP/SV block) 43. Thus the RWI 20 does not wait until the CAP/SV block 43 is received in its entirety prior to transmitting the P1800 preamble 52. This is a key aspect of the present invention, which is distinguishable from the store and forward systems utilized in the prior art that were designed to store the entire portion of the messages following the signalling preamble, prior to the commencement of signalling on the other side of the communications link. Thus, if a store and forward system were to be utilized in FIG. 4, the P1800 sequence 52 would not commence until at least the time $t_2$ corresponding to the end of the CAP/SV block 43. Accordingly, the system of the present invention affords a substantial reduction in call set up time as compared to the store and forward modem conversion systems used previously.

Following the P1800 block 52, another P1800 block 54 is transmitted after a predetermined GAP frame 53. The GAP frame 53 is a necessary silent time frame to enable echoes from the P1800 sequence 52 to be received, thereby enabling subsequent echo cancellation to be performed. In the STU-III wire-line protocol, the two P1800 sequences 52 and 54 separated by the GAP 53 identifies the commencement of a call. Then, to provide for a secure communication link, a scrambled message block SCRA is transmitted which will excite the current communication link and allows the subsequent traffic data transmission to be demodulated properly. After the SCRA block, a start bit block S, CAP/SV block 47 and an end bit block E are sent. The CAP/SV block 47 contains the information within the CAP/SV block 43 transmitted over the HF radio link. The S and E bits are necessary in the STU-III wire-line format.

Once the STU-III receives the signalling/message block 44, the STU III begins transmitting a signalling/message block 46 at the time $t_4$. The time interval between $t_3$ and $t_4$ will of course depend upon the switching capabilities of the PSTN Central Office. At the start of the block 46, a P1800 signalling sequence is followed by a scrambling sequence SCRC which is essentially a favorable response to the SCRA scrambling sequence received by the STU III. Thereafter, a start block S is followed by a CAP/SV block which functions to announce the capabilities of the STU III. A FILLER block then follows, which allows information associated with cryptographic key transfers to be processed. Another S block, a Terminal Cipher (TC) block and an end block E then complete the signalling/message block 46.

Once the RWI 20 receives the beginning portion of the STU III transmitted block 46, it begins a corresponding transmission of a signalling/message block 48 on the HF side towards the KY-99. The block 48 begins with a HF preamble 51 at time $t_6$ which is in the example, a short time duration on the order of 100 ms following the end of the SCRC block at time $t_5$. Hence, the RWI 20 begins the corresponding transmission on the HF side, prior to receiving the entire signalling/message sequence 46 from the STU III. Accordingly, a significant reduction in call set-up time over store and forward systems is obtained with the current invention.

In the HF Preamble 51 of the signalling/message block 48, the bits within the Framing Sequence 49 are inverted as compared to those within the Framing Sequence of the HF Preamble 42 originally transmitted. This inversion of the Framing Sequence bits identifies that the return communication is one that has originated at a STU III. Moreover, if the original call had been placed from the STU III rather than from the KY-99, the framing sequence is the HF Preamble transmitted by the RWI 20 towards the KY-99, would also be inverted as compared to that transmitted by the KY-99 in order to identify that the call was originating from a STU III.

The signalling/message block 50 transmitted by the KY-99 is then followed by a signalling/message block 52 transmitted by the RWI 20 towards the STU III again. It is seen that the RWI 20 sends the P1800 tones within block 52 while the TC, FILLER and RCC messages of block 50 are still being transmitted towards the RWI 20, once again minimizing call set-up delays.

Figure 5:
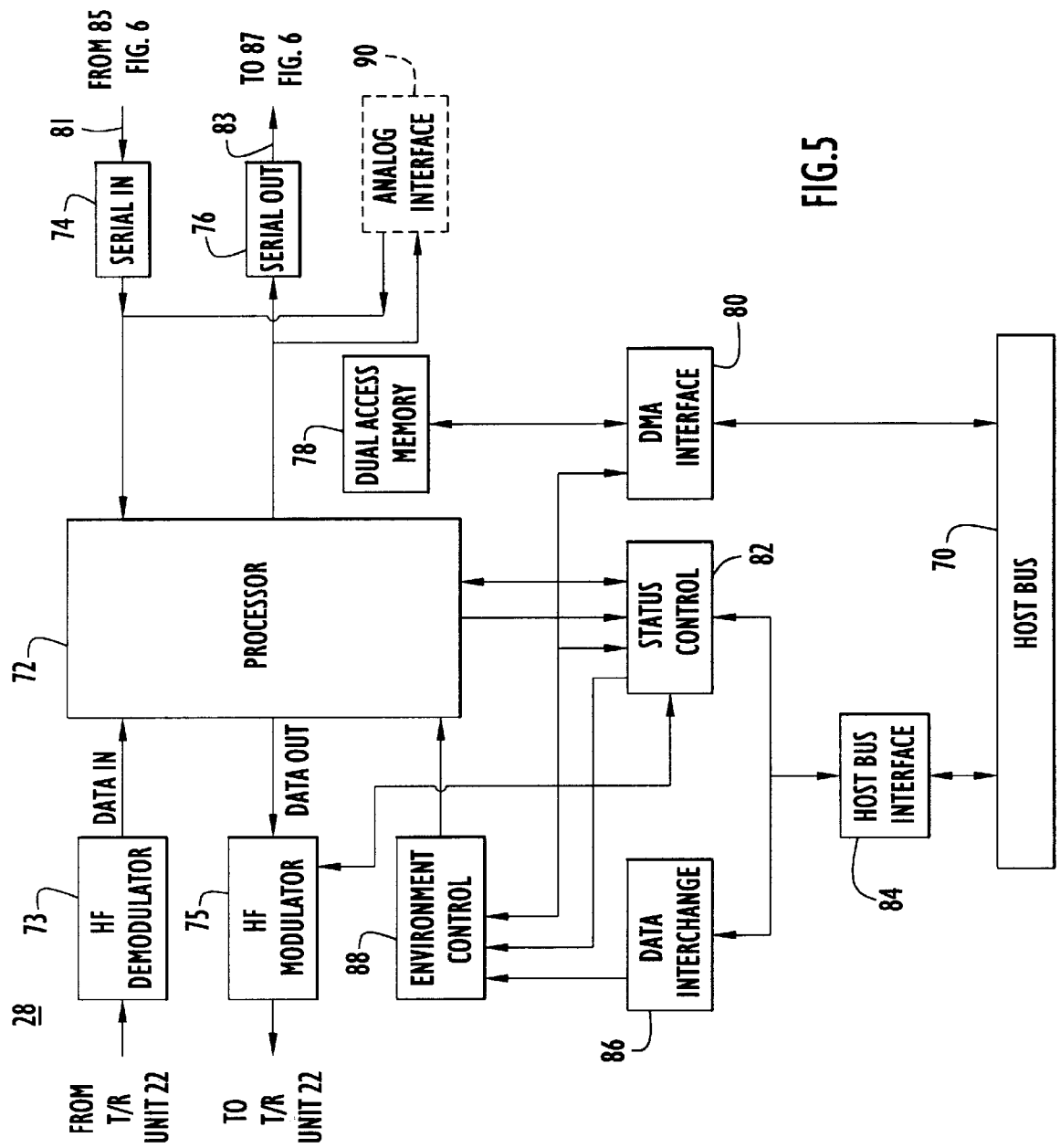
FIG. 5 shows an embodiment of the HF Modem of FIG. 2.

Having thus discussed one example of signalling, message and traffic data transmission sequences within the communications link 10, the preferred configurations for the HF and wire-line modems 28 and 30 of the RWI 20 are now presented. Shown in FIG. 5 is an embodiment of the HF modem 28, in which a Host Bus 70 is the conduit for control signals received from the PC Controller/Processor 40 and for the control signals passing to and from the HF Radio Transmit/Receive (T/R) unit 22. Modulated signalling and message data received by the T/R unit 22 on the HF side is demodulated by a conventional demodulator 73 and inputted to a processor 72, such as a Texas Instruments TMS320C25 processor. In the reverse direction, the processor 72 outputs data to a conventional HF modulator 75 where it is modulated in the proper HF format and outputed to the T/R unit 22. The modulator 75 modulates voice data in a thirty-nine tone, parallel tone format whereas other types of data are modulated in a sixteen tone, parallel tone format. A control signal supplied from a Status/Control circuit 82 to the modulator 75 will control the modulator operating mode, i.e. sixteen tone or thirty-nine tone.

Figure 6:
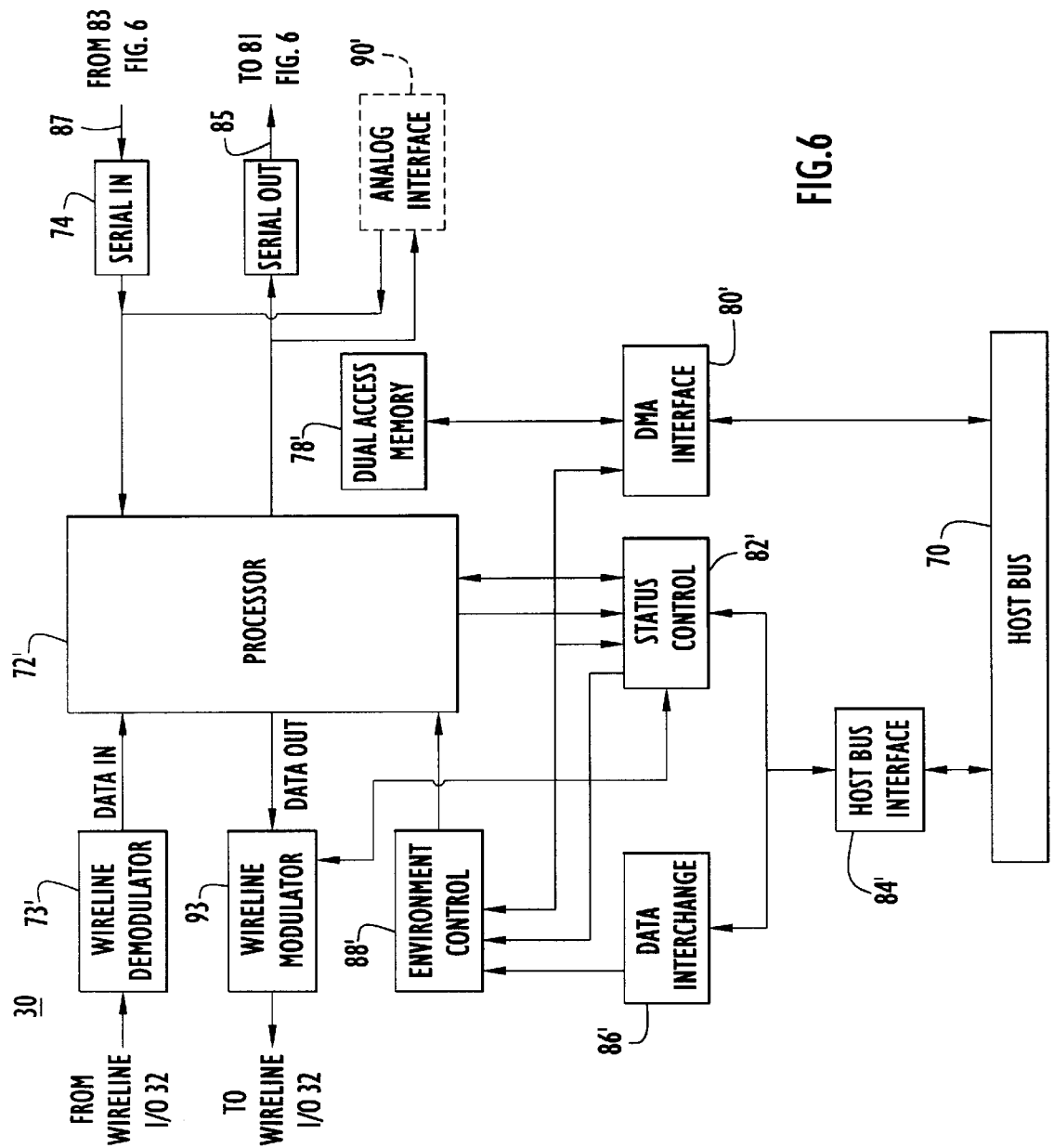
FIG. 6 shows an embodiment of the Wire-line Modem of FIG. 2.

A Serial In Interface 74 and Serial Out Interface 76 are employed as data interfaces to the wire-line modem 30 of FIG. 6 to allow data transfer between the two modems. The output line 83 will output data to the input line 87 of the wire line modem 30; the input line 81 receives data from the output line 85. The modem 30 of FIG. 6 is advantageously of the same basic configuration as the modem 28, with the exception of the wire-line modulator 93 and demodulator 91 replacing the respective HF modulator 75 and demodulator 73. Otherwise, the same components can be utilized for both modems 28 and 30, including a Dual Access Memory 786, a Dynamic Memory Access Interface 806, an Environmental Control Block 886, a Data Interchange Circuit 866, a Host Bus Interface 846 and an Optional Analog Interface 906.

The software routines which run on the PC Controller/ Processor 40 of FIG. 2 and within the processors 72 of the HF and wire-line modems to provide the signalling and messaging communications as shown in FIG. 4, shall now be described. It is noted at the outset that each of the processors 72 are located on a separate PC ISA card, such as a Chimera card, which is a commercially available card, manufactured by Atlanta Signal Processor Corp. based in Atlanta, Ga. The PC ISA card interfaces to the system via the ISA bus.

The PC Controller/Processor 40 of FIG. 2. loads executable code from its disk into the processors 72 of the HF and wire-line modems, facilitates communications between the processors 72, and displays status and debug information from the processors 72.

The RWI 20 executable code is invoked from MS-DOS with the command: RWI hfmod.out wlmod.out. The two arguments to the command, hfmod.out and wlmod.out, are the names of files containing the executable code in Common Object File Format which will run in the processors 72 of the HF wire-line modems.

When the command is invoked, the PC Controller/ Processor 40 of FIG. 2 generates environmental variables, HFMOD and WLMOD, which describe information required so that the PC Controller Processor 40 can communicate with the processors 72. This information includes the PC base address, Input/Output (I/O) port number, PC interrupt level, etc.

When a valid environmental variable is found, the PC Controller/Processor 40 loads the corresponding Common Object File Format file into the corresponding processor 72. The PC Controller/Processor 40 releases the hold lines and resets the processors 72 all the Common Object File Format file has been loaded, resulting in each processor 72 receiving a clean boot. By utilizing this scheme, the system can grow without adding any new software to the PC Controller/ Processor 40.

The PC Controller/Processor 40 enables all interrupts and Direct Memory Access channels specified by the environment variables, HFMOD and WLMOD. The Direct Memory Access channels allow the processors 72 to send status and debug information to the PC Controller/Processor 40.

The PC Controller/Processor 40 will loop reading status and debug information from PC memory buffers where the Direct Memory Access controllers are programmed to write and intelligently display this information. A keyboard can be used to specify which status and debug data to display as well as to terminate the execution. Direct Memory Access communication from the PC Controller/Processor 40 to the processors 72 is possible, but has not been implemented.

As the PC Controller/Processor 40 releases the hold and reset lines of the processors 72, their software begins to run. The following steps are then taken by the software to initialize the system:

1. Initialize all internal resources.
2. Initialize all hardware resources.
3. Initialize all application software data and structures.
4. Enable interrupts.

Figure 7:
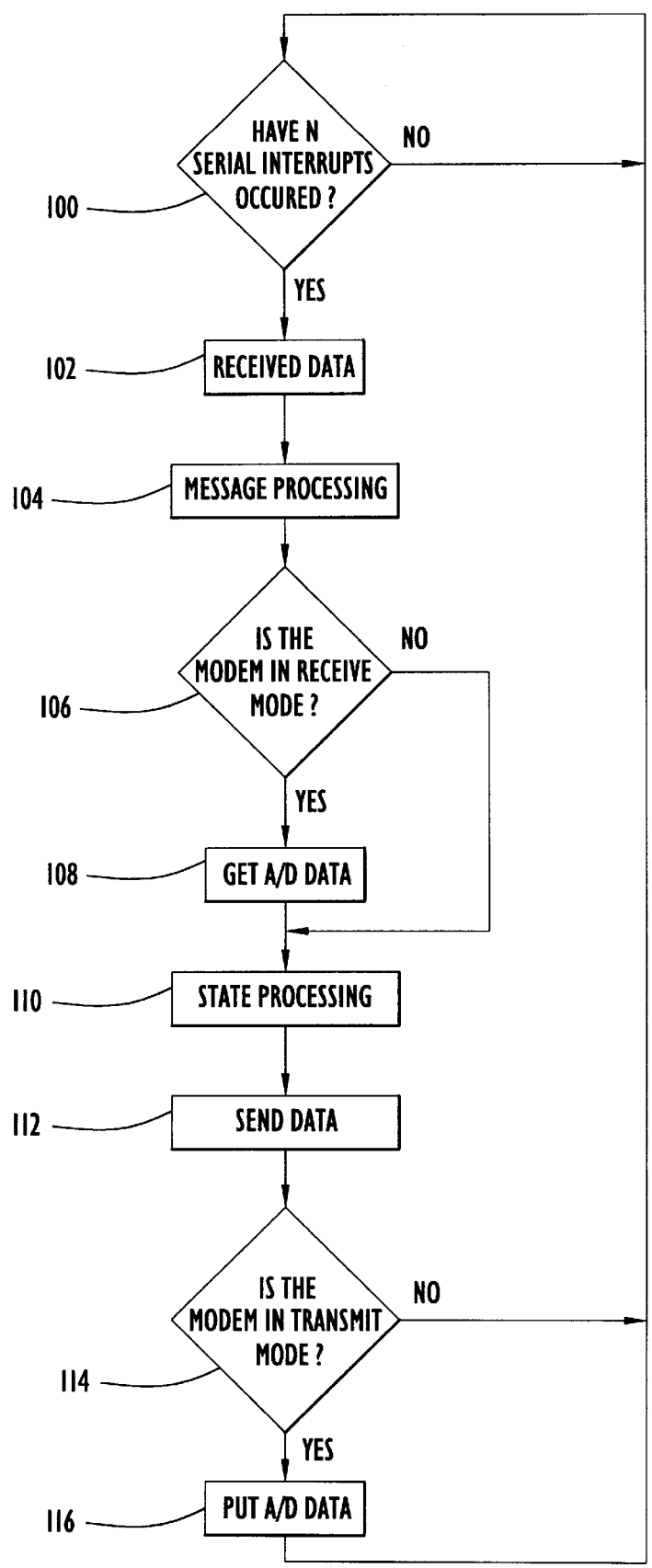
FIG. 7 depicts a software flow chart for frame processing.

Referring to FIG. 7 the operational flow of the software for frame processing that runs on processors 72 will now be explained.

In the first step 100, the system loops until N serial interrupts have occurred. This condition signals the start of a frame processing.

In the next step the received data processing block 102 (rcvIpc) is responsible for taking all data that has been received from the PC Controller/Processor 40 since the last time a frame was processed and distributing the data. Received data processing block 102 (rcvIpc) examines the upper eight bits which specify if the data is a message from another processor 72 or some kind of traffic data. If the data is a message, it is placed into a message buffer. If it is data, then the upper 8 bits are again examined in order to determine which state machine's holding buffer this data should be placed into.

During the next step, the message processing block 104 (msgproc) processes all messages that were enqueued by received data processing block 102 (rcvIpc). Each message specifies a particular state machine in the upper eight bits and a unique 1 out of 256 bits in the lower 8 bits. The messages will cause particular event bits to be set in an event bit field that is "visible" only to the message processing block 104 (msgProc) and the state processing block 110 (statProc). Each state machine has its own private event bit field which is used in conjunction with application specific state tables to control the current state of the particular machine.

In the next step 106, the system tests if the RWI 20 is idle or the particular processor 72 is in modem receive mode. When this is true, the next step get A/D data 108 (getanadt) is preformed, wherein all A/D data that has been acquired, since the last time a frame was processed, is removed from the SINT receive buffer and is placed in an application specific input buffer for processing. Otherwise, processing step getanadt 108 is skipped.

The central part of processing a frame is the state processing block 110 (statProc), which is responsible for executing up to eight independent threads of processing as though each thread was a state machine. Each thread is executed once per frame. A State Variable Block, associated with each state machine, saves the state machine's state and determines when to change states. The State Variable Block contains:

1. A state table entry, also known as a procedure list entry. This contains the current state of the machine, which is a pointer to a ROM based list of event numbers and an associated function list.
2. The current sub state of the machine, which is a pointer to a ROM based list of functions run unconditionally without the association of an event bit.
3. The event bit field, which is set by msgProc and cleared by statProc when a set event is found which has been specified in the current state table entry.

4. Two frame down counters. The counters are used to generate delays. They decrement once a frame and specific bits within the current machine's event bit field are set when a non zero timer decrements to zero.

When state processing starts, a table of pointers to all active State Variable Blocks will be examined. The sub state pointer which is copied to a global location, accesses a list of routines to be run unconditionally. The global location permits any of the application routines access parameters and/or alter which list of routines will be run. After running the unconditional list, the machine's state pointer is used to examine a ROM based list of state table entries. Each entry in the table contains an event bit number and a list of routines to run if the specified event bit is set in the event bit field within the State Variable Block. When a set event is located, the associated list of application functions are run. After the last function has been run, control is returned to statproc. A pointer to the list of routines running is globally available in order that any of the application functions can access parameters and/or alter which list of routines will be run. Any of the application routines can call the system level function sndMsg. The sndMsg function will enque a message to be sent to any machine, even to itself.

The next step send data processing 112 (sndIpc) takes all messages and/or data, enqued by the application routines run by statproc, and distributes the data utilizing the routing information in the upper eight bits of each data value. The routing information provides an index into a table of drivers. The drivers contain the low level information with respect to how to get data to another machine, inter or intra processor. The system is easily expanded by adding additional processors. If data is enqued to be sent to the PC Controller/Processor 40 the timer interrupt (TINT) is enabled. By writing drivers to access the additional processors, they become part of the heterogenous system.

The next step 114, the system tests if the modem application is in the transmit mode. If it is in the transmit mode the step put D/A data 116 (putanadt) is run. Processor step putanadt 116 takes the D/A data created during the application during the last frame and transfers it to a circular buffer. The circular buffer is read by the serial transmit interrupt handler. While this routine is application specific, the serial transmit interrupt handler and the circular transmit buffer are common to all applications.

The system loops back to step 100.

It should be understood that the embodiments described herein are merely exemplary and that a person skilled in the art may make variations and modifications without departing from the spirit and scope of the invention. All such variations and modifications are intended to be included within the scope of the invention as defined in the appended claims.

What is claimed is:

1. In a communication system for transmitting messages between a first communication device and a second communication device over a communication link comprising a first transmission channel of a first type and a second transmission channel of a second type, an interface device coupling the first and second transmission channels, comprising:

a first modem coupled to the first transmission channel and responsive to a first data block received over the first transmission channel to demodulate the first data block, the first data block comprising: a header portion containing first signaling information corresponding to the first type of transmission channel, for determining transmission characteristics of the first transmission channel; and a message portion containing message information bound for the second communication device;

a second modem coupled to said first modem and the second transmission channel, said second modem receiving said message information demodulated by said first modem and modulating a second data block for transmission over the second transmission channel, the second data block comprising: a header portion containing second signaling information corresponding to the second type of transmission channel, for determining transmission characteristics of the second transmission channel; and a message portion containing said message information; and a processor coupled to said first and second modems and configured to control said first and second modems, such that the interface begins transmission of the second signaling information contained in the second data block over the second transmission channel before reception of the first data block is completed.

2. The interface of claim 1, wherein:

the first transmission channel is a wireless transmission channel and the second transmission channel is a wire-line transmission channel;

said first modem is a wireless modem;

said second modem is a wire-line modem; and said interface is a radio to wire-line interface.

3. The interface of claim 2, wherein said interface receives as the first signaling information Doppler tones in the header portion of the first data block, and said interface transmits as the second signaling information echo cancellation tones in the header portion of the second data block.

4. The interface of claim 1, wherein:

the first data block is transmitted on the first transmission channel using a first modulation scheme and the second data block is transmitted on the second transmission channel using a second modulation scheme;

said first modem demodulates the first data block received at the interface in accordance with the first modulation scheme; and said second modem modulates the second data block in accordance with the second modulation scheme.

5. The interface of claim 1, wherein the interface begins transmitting the second data block to the second communication device at the approximate time that the interface begins receiving the message portion of the first data block.

6. The interface of claim 1, wherein the message information is digitized voice information or computer data.

7. A method of communicating between a first communication device and a second communication device over a communication link comprising a first transmission channel of a first type and a second transmission channel of a second type, the method comprising the steps of:

(a) transmitting from the first communication device on the first transmission channel a first data block comprising a header portion containing first signaling information corresponding to the first type of transmission channel, for determining transmission characteristics of the first transmission channel; and a message portion containing message information bound for the second communication device;

(b) receiving the first data block at an interface between the first and second transmission channels; and (c) transmitting from the interface on the second transmission channel a second data block comprising: a header portion containing second signaling information corresponding to the second type of transmission channel, for determining transmission characteristics of the second transmission channel; and a message portion containing said message information bound for the second communication device, wherein the interface begins transmission of the second data block before reception of the first data block is completed.

8. The method of claim 7, wherein the first transmission channel is a wireless transmission channel and the second transmission channel is a wire-line transmission channel, wherein:

step (a) includes transmitting Doppler tones in the signalling portion of the first data block; and step (c) includes transmitting echo cancellation tones in the signalling portion of the second data block, the method further comprising the steps of:

(d) determining Doppler shifts on the first transmission channel using the Doppler tones; and (e) canceling echoes on the second transmission channel using the echo cancellation tones.

9. The method of claim 7, wherein the first data block is transmitted on the first transmission channel using a first modulation scheme and the second data block is transmitted on the second transmission channel using a second modulation scheme, the method further comprising the steps of:

(d) demodulating the first data block received at the interface in accordance with the first modulation scheme; and (e) modulating the second data block in accordance with the second modulation scheme.

10. The method of claim 7, wherein the interface begins transmitting the second data block to the second communication device at the approximate time that the interface begins receiving the message portion of the first data block.

11. A data transmission structure for transmitting inter-device messages between first and second communication devices over a data communication link comprising plural different types of transmission channels, the structure comprising:

a preamble containing signaling information for determining transmission channel characteristics, wherein the content of the signaling information varies during transmission between the first and second communication devices in accordance with the type of transmission channel carrying the data transmission structure; and a message block containing message information to be transmitted between the first and second communication devices, the message information contained in the message block remaining the same throughout transmission between the first and second communication devices;

wherein the content of the signaling information to be transmitted within the preamble on each transmission channel of the communication link is independent of the message information contained in the message block, such that the data transmission structure permits an interface between two types of transmission channels in the communication link to initiate transmission of the preamble of the data transmission structure on one transmission channel before reception of the message block of the data transmission structure on another transmission channel is completed.

12. The data transmission structure of claim 11, wherein the communication link includes a wireless transmission channel and a wire-line transmission channel, and wherein:

the signaling information contained in the preamble of the data transmission structure comprises Doppler tones over the wireless transmission channel; and the signaling information contained in the preamble of the data transmission structure comprises echo cancellation tones over the wire-line transmission channel.

\* \* \* \* \*